Sept. 14, 1926.
P. SQUIRE
1,600,074
PRINTER'S ROLLER COMPOSITION
Filed Jan. 23, 1926
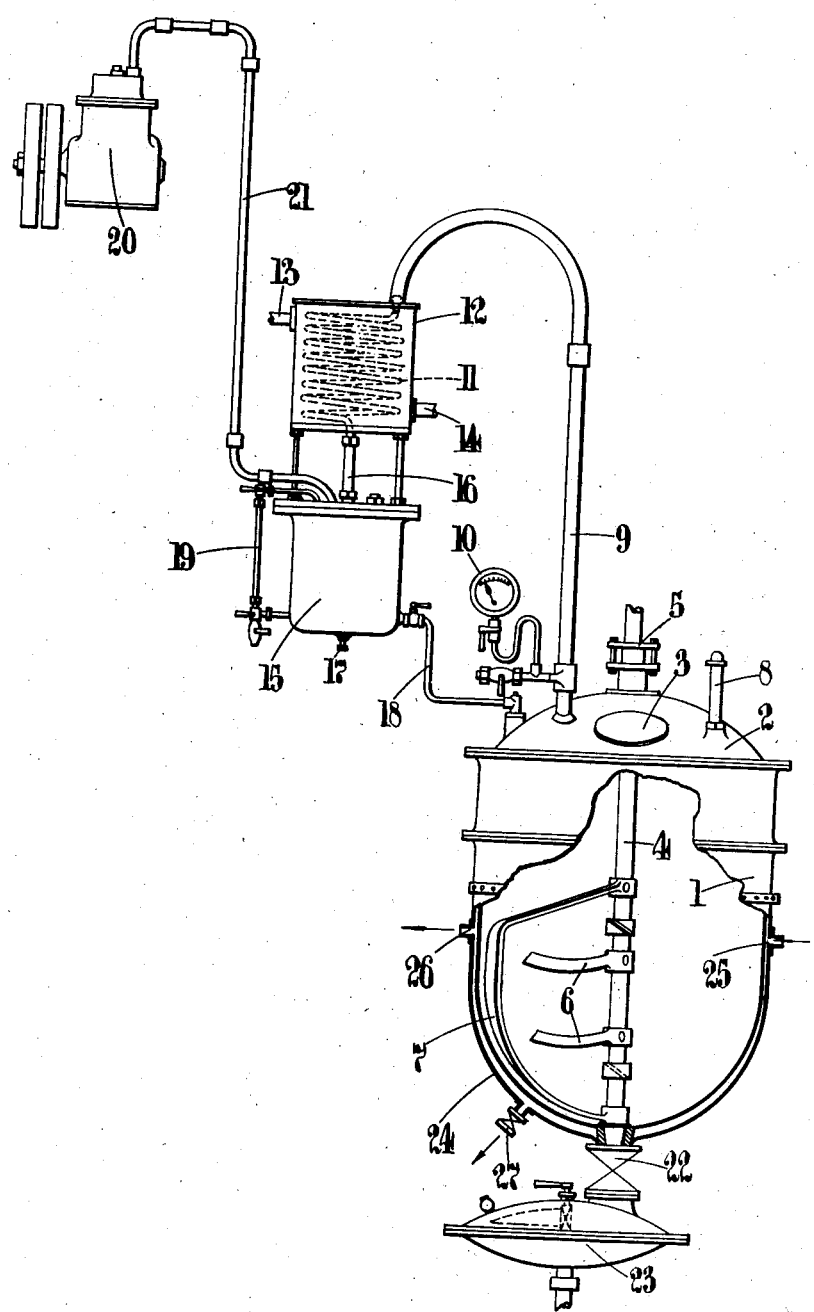
INVENTOR
Percy Squire
BY Gill & Jennings
ATTORNEYS Patented Sept. 14, 1926.

1,600,074

UNITED STATES PATENT OFFICE.

PERCY SQUIRE, OF LONDON, ENGLAND.

PRINTER'S ROLLER COMPOSITION.

Application filed January 23, 1926, Serial No. 83,303, and in Great Britain December 11, 1924.

This invention relates to the manufacture of composition for printers' inking rollers and the like printing surfaces.

It has been the usual practice in making these compositions from ingredients such as soaked gelatine and glycerine to mix the ingredients and to heat them to a considerable temperature with the result that not only is the composition discoloured, probably due to a certain amount of de-composition, but it is apt to lose its resiliency and become hard and also compositions of this kind inevitably enclose a number of air bubbles which tend to produce an inferior surface. It is the object of the present invention to avoid these drawbacks and to produce a composition free from air bubbles and resilient but tough and also although this is not of such great importance comparatively transparent and light in colour.

To this end according to the present invention the ingredients for the roller composition and the like such as soaked gelatine and glycerine are mixed in a steam jacketed or similarly heated container under a vacuum so that the product may be manufactured at a relatively low temperature and therefore retains its resiliency and transparent appearance and at the same time owing to the relatively high degree of vacuum, every trace of air is abstracted from the composition.

One construction of apparatus required to carry out the process according to the invention, will now be described by way of example with reference to the accompanying drawing.

The receiving vessel or pan 1 is provided with a steam jacket 24 by means of which the temperature of the vessel 1 may be raised. The steam enters the jacket 24 at the inlet 25 and leaves at the outlet 26, a draw-off cock being provided at 27. The vessel 1 has an airtight cover 2 provided with a removable plate 3 by means of which the materials such as soaked gelatine and glycerine are introduced into the vessel. The vessel 1 is also provided with a centrally disposed shaft 4 passing through a stuffing box 5 and journalled in the bottom of the vessel. This shaft 4 is adapted to be driven from any suitable source of power and carries agitating vanes 6 and a scraping vane or arm 7, this latter being shaped so as to scrape off the mixture from the sides of the vessel 1. The cover 2 is fitted with a thermometer 8 and an exhaust pipe 9, this latter being fitted with a vacuum gauge 10. The exhaust pipe 9 is connected to a condenser comprising a coil 11 disposed within a container 12 provided with inlet and outlet pipes 13 and 14 respectively for any suitable cooling liquid. The coil 11 is connected to a chamber 15 through a pipe 16 and condensed liquid may be discharged from the bottom of the chamber 15 through a cock 17 or may be returned to the vessel 1 through a pipe connection 18 as required. The chamber 15 is provided with a water gauge 19, and is connected to an exhaust pump 20 through a pipe 21. At the bottom of the receiving vessel 1, there is provided a valve 22 by means of which the composition may be withdrawn at the end of the process and passed through an enclosed filter indicated at 23. To allow the composition to be withdrawn, the shaft 4 is raised from its bearing in the bottom of the vessel 1. The composition is then run into moulds in the usual manner.

In carrying out an actual process, the mixture of soaked gelatine and glycerine is placed in the vessel 1 and a vacuum of about 22 inches of mercury, that is a pressure of about 8 inches of mercury, maintained therein by means of the pump 20. The vessel 1 is heated by steam up to a temperature of about 170°–180° F. and the mixture agitated by means of the vanes 6.

Owing to the materials being heated under reduced pressure, the temperature of the mixture may be kept much lower than usual, whilst extracting all the air from the composition. In consequence of this, the resiliency of the composition is retained as well as its transparent appearance.

Instead of heating a mixture of soaked gelatine and glycerine alone in the vessel 1, pieces of old compositions taken from rollers in use, may be added to the mixture and the whole heated up together, the process then being the same as in the previous example. In this case even any air-bubbles which may have been in the old composition will be extracted.

Having thus described my invention, what I claim as new and desire to secure by Letters Patent is:—

1. A process for manufacturing compositions for printers' inking rollers consisting in heating together soaked gelatine and glycerine at a low temperature and under reduced pressure so as to remove all trace of air.

2. A process for manufacturing compositions for printers' inking rollers consisting in heating by jacketed steam water soaked gelatine together with glycerine at a low temperature and under reduced pressure so as to remove all trace of air.

3. A process for manufacturing compositions for printers' inking rollers, consisting in heating together soaked gelatine and glycerine at about 170° F. to 180° F. under a vacuum of about 22 inches of mercury.

4. A process for manufacturing compositions for printers' inking rollers consisting in heating together at a relatively low temperature under reduced pressure soaked gelatine and glycerine together with an amount of old composition.

In witness whereof, I hereunto subscribe my name this 7th day of January, A. D. 1926.

PERCY SQUIRE.